US012390739B2

(12) United States Patent
Hayashi et al.

(10) Patent No.: US 12,390,739 B2
(45) Date of Patent: Aug. 19, 2025

(54) NON-TRANSITORY COMPUTER-READABLE STORAGE MEDIUM HAVING STORED THEREIN INFORMATION PROCESSING PROGRAM, INFORMATION PROCESSING APPARATUS, INFORMATION PROCESSING SYSTEM, AND INFORMATION PROCESSING METHOD

(71) Applicant: Nintendo Co., Ltd., Kyoto (JP)

(72) Inventors: Yugo Hayashi, Kyoto (JP); Kosuke Yabuki, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 331 days.

(21) Appl. No.: 18/114,767

(22) Filed: Feb. 27, 2023

(65) Prior Publication Data
US 2023/0277945 A1 Sep. 7, 2023

(30) Foreign Application Priority Data
Feb. 28, 2022 (JP) ................................. 2022-030034

(51) Int. Cl.
*A63F 13/69* (2014.01)
*A63F 13/79* (2014.01)
(52) U.S. Cl.
CPC .............. *A63F 13/79* (2014.09); *A63F 13/69* (2014.09); *A63F 2300/5553* (2013.01)
(58) Field of Classification Search
None
See application file for complete search history.

(56) References Cited

U.S. PATENT DOCUMENTS

2005/0137015 A1* 6/2005 Rogers .................... A63F 13/12
463/42

OTHER PUBLICATIONS

Mario Kart 8 Deluxe, Mario Kart Racing Wiki _ Fandom, https://web.archive.org/web/20211207152657/https://mariokart.fandom.com/wiki/Mario_Kart_8_Deluxe, Dec. 7, 2021 (Year: 2021).*
Mario Kart 8 Deluxe—Guide and Walkthrough—Nintendo Switch—By super_luigi16—GameFAQs, https://gamefaqs.gamespot.com/switch/200276-mario-kart-8-deluxe/faqs/69430, Jun. 25, 2014 (Year: 2014).*

(Continued)

*Primary Examiner* — Damon J Pierce
(74) *Attorney, Agent, or Firm* — Nixon & Vanderhye PC

(57) ABSTRACT

A game system (100) comprises: an object management section (111) that associates a game object for which an acquisition condition is met with user's identification information; an game execution section (112) that executes a game using a game object selected by the user from among the game objects associated with the user's identification information; and the parameter determination section (113) that determines parameters to be given to the user to obtain in-game rewards according to the game objects used in the game. The game execution section (112) further executes the game using a combination of a decorative object and an in-game avatar. When the user executes the game using the combination of the decorative object and the in-game avatar, the parameter determination section (113) determines the parameter so that the value of the parameter becomes larger the greater the number of the decorative object types.

20 Claims, 11 Drawing Sheets

(56) References Cited

OTHER PUBLICATIONS

All Amiibo Mii Suits in Mario Kart 8 Deluxe!, YouTube video, AbdallahSmash, https://www.youtube.com/watch?v=rfJf7j0T-mc, Apr. 27, 2021 (Year: 2021).*
"Mario Kart Tour", Nintendo Co., Ltd., [Online] [Search Date] Jan. 31, 2022, 18 pages with English Translation, Internet URL:https://mariokarttour.com/ja-JP.
"Mario Kart 8", Nintendo Co., Ltd., [Online] [Search Date] Jan. 31, 2022, 1 page, Internet <URL:https://www.nintendo.co.jp/wiiu/amkj/amiibo/index.html>.

* cited by examiner

| USER ID | NUMBER OF TYPES OF CHARACTER SUITS |
|---|---|

FIG.10

| NUMBER OF TYPES OF CHARACTER SUITS | ADDITIONAL POINT |
|---|---|
| 0 | 0 |
| 1 | 0 |
| 2 | 10 |
| 3 | 20 |
| 4 | 30 |
| 5 | 40 |
| ⋮ | ⋮ |

FIG.11

NON-TRANSITORY COMPUTER-READABLE STORAGE MEDIUM HAVING STORED THEREIN INFORMATION PROCESSING PROGRAM, INFORMATION PROCESSING APPARATUS, INFORMATION PROCESSING SYSTEM, AND INFORMATION PROCESSING METHOD

CROSS REFERENCE TO RELATED APPLICATION

This nonprovisional application is based on Japanese Patent Application No. 2022-030034 filed with the Japan Patent Office on Feb. 28, 2022, the entire contents of which are incorporated herein by reference.

FIELD

The present disclosure relates to an information processing program, an information processing apparatus, an information processing system, and an information processing method for executing games using game objects selected by a user.

BACKGROUND AND SUMMARY

Conventionally, it is known that a game is executed using a game object selected by a user from a plurality of game object candidates (See, for example, https://mariokarttour.com/ja-JP). Such game objects include, for example, player characters, equipment of player characters, items used by player characters in games, and decorations of player characters.

There are also known games in which the user selects an avatar to be the player character and a decorative object to decorate the avatar, and the game is played using the avatar decorated with the decorative object as the player character (See, for example, https://www.nintendo.co.jp/wiiu/amkj/amiibo/index.html).

The purpose of the present disclosure is to provide a novel information processing program, information processing apparatus, information processing system, and information processing method for executing a game using a game object selected by a user.

A non-transitory computer-readable storage medium in an aspect stores an information processing program, which determines a parameter to be granted to a user to obtain an in-game reward, such that the higher the number of types of decorative objects possessed by the user, the higher the parameter. This information processing program is an information processing program to be executed on a computer of an information processing apparatus, wherein the information processing program causes a computer to function as: an object management section configured to associate at least some game objects from a group of game objects comprising a plurality of types of game objects, for which an user has met the acquisition conditions, with the user's identification information; a game execution section configured to execute a game using the game object selected by the user from among the game objects associated with the user's identification information; and a parameter determination section configured to determine parameters for granting in-game rewards to the user at least according to the game objects used in the game, wherein the game execution section is further configured to execute the game using a combination of the decorative object and the in-game avatar when the object type of the game object selected by the user is a decorative object, wherein the parameter determination section determines the parameter so that, when the user executes the game using the combination of the decorative object and the in-game avatar, at least the value of the parameter becomes larger the greater the number of the decorative object types that are associated with the user's identification information.

In the above non-transitory computer-readable storage medium, the parameter determination section may be further configured to, when the user participates in the game by using the game object whose object type is different from the decorative object, determine the parameter to be granted to the user not based on the number of types of the game object that are different from the decorative object, but based on at least one of the number of times the game object is used to enhance the game object or the experience value accumulated in accordance with the number of times the game object is used.

In the above non-transitory computer-readable storage medium, the in-game avatars may be of multiple types.

In addition, an in-game reward may be given when the parameter reaches a threshold value. That is, in the above non-transitory computer-readable storage medium, the information processing program may further cause a computer to function as a reward granting section configured to grant the in-game reward to the user if the parameter determined by the parameter determination section reaches a threshold value after the game ends.

There may be an upper limit to the in-game rewards that can be granted to the user in a single stage, and the user may play the same game stage many times and still receive in-game rewards only up to the upper limit. That is, in the above non-transitory computer-readable storage medium, the game execution section may be configured to execute a game associated with an in-game stage, and the reward granting section may be configured to grant the in-game reward corresponding to at least one threshold value set for each in-game stage when the parameter reaches the threshold value, and to not grant the in-game reward corresponding to the threshold value when the parameter again reaches the threshold value.

The parameter may not be made higher when a decorative object is acquired in duplicate. That is, in the above non-transitory computer-readable storage medium, the parameter determination section may be configured to not determine the parameter to be higher in proportion to the number of the duplicates when the acquisition condition is met for a decorative object of the same type as the decorative object already associated with the user identification information.

In the case of duplications, the performance of the decorative object may be enhanced. That is, in the above non-transitory computer-readable storage medium, the information processing program may further cause a computer to function as an object enhancement section configured to, when the acquisition condition is met for a decorative object of the same type as the decorative object already associated with the user's identification information in duplicate, enhance a performance of the decorative object in proportion to the number of duplicates.

In addition, an upper limit may be set for enhancing the performance of the decorative object by duplication. That is, in the above non-transitory computer-readable storage medium, the decorative object enhancement section may be further configured to enhance the performance of the decorative object in proportion to the number of duplicates within the upper limit of the number of duplicates.

It may also present parameters that are increased according to the number of types. That is, in the above non-transitory computer-readable storage medium, the information processing program may further cause a computer to function as a parameter presentation section configured to present to the user an increased value of a parameter based on the number of types of the decorative objects associated with the user's identification information.

In addition, the appearance of the avatar may be changeable. That is, in the above non-transitory computer-readable storage medium, the information processing program may further cause a computer to function as an avatar changing section configured to change the appearance of the in-game avatar in response to the user's instruction input.

In addition, the avatar may be selectable. That is, in the above non-transitory computer-readable storage medium, the game execution section may be further configured to, when the object type of the game object selected by the user is a decorative object, combine the in-game avatar selected by the user from a plurality of selectable groups of the in-game avatars with the decorative objects and execute the game.

The combination of decorative objects and avatars may be changeable. That is, in the above non-transitory computer-readable storage medium, the information processing program may further cause a computer to function as a combination modification section configured to modify the combination of the respective decorative objects and the respective in-game avatars based on the user's instruction input.

The parameter to be determined may be increased by a certain increasing range according to the number of types of decorative objects. That is, in the above non-transitory computer-readable storage medium, the parameter determination section may be configured to increase the value of the parameter by a constant increasing range with each increase in the number of types of the decorative objects associated with the user identification information.

In addition, decorative objects may be purchasable at a store. That is, in the above non-transitory computer-readable storage medium, the acquisition condition may include the purchase of decorative objects from an in-game store by the user.

The decorative object may be obtainable by lottery. That is, in the above non-transitory computer-readable storage medium, the acquisition condition may include that a lottery for acquiring at least some of the decorative objects from a group of decorative objects comprising a plurality of the decorative objects is drawn, and it is determined which of the decorative objects is to be acquired by the user.

The first decorative object may be granted automatically. That is, in the above non-transitory computer-readable storage medium, the acquisition condition may include that the user has not acquired any of the decorative objects.

In addition, an upper limit may be set on the parameters granted according to the number of types. That is, in the above non-transitory computer-readable storage medium, the parameter determination section may determine a parameter increase value based on the number of types of the decorative objects associated with the user's identification information within an upper limit.

An information processing apparatus in an aspect comprises: an object management section configured to associate at least some game objects from a group of game objects comprising a plurality of types of game objects, for which an user has met the acquisition conditions, with the user's identification information; a game execution section configured to execute a game using the game object selected by the user from among the game objects associated with the user's identification information; and a parameter determination section configured to determine parameters for granting in-game rewards to the user at least according to the game objects used in the game, wherein the game execution section is further configured to execute the game using a combination of the decorative object and the in-game avatar when the object type of the game object selected by the user is a decorative object, wherein the parameter determination section determines the parameter so that, when the user executes the game using the combination of the decorative object and the in-game avatar, at least the value of the parameter becomes larger the greater the number of the decorative object types that are associated with the user's identification information.

An information processing system in an aspect comprises: an object management section configured to associate at least some game objects from a group of game objects comprising a plurality of types of game objects, for which an user has met the acquisition conditions, with the user's identification information; a game execution section configured to execute a game using the game object selected by the user from among the game objects associated with the user's identification information; and a parameter determination section configured to determine parameters for granting in-game rewards to the user at least according to the game objects used in the game, wherein the game execution section is further configured to execute the game using a combination of the decorative object and the in-game avatar when the object type of the game object selected by the user is a decorative object, wherein the parameter determination section determines the parameter so that, when the user executes the game using the combination of the decorative object and the in-game avatar, at least the value of the parameter becomes larger the greater the number of the decorative object types that are associated with the user's identification information.

An information processing method in an aspect is an information processing method executed in an information processing apparatus, the method comprising: associating at least some game objects from a group of game objects comprising a plurality of types of game objects, for which an user has met the acquisition conditions, with the user's identification information; executing a game using the game object selected by the user from among the game objects associated with the user's identification information; and determining parameters for granting in-game rewards to the user at least according to the game objects used in the game, wherein in the executing of the game, further executing the game using a combination of the decorative object and the in-game avatar when the object type of the game object selected by the user is a decorative object, wherein in the determining of the parameter determines the parameter so that, when the user executes the game using the combination of the decorative object and the in-game avatar, at least the value of the parameter becomes larger the greater the number of the decorative object types that are associated with the user's identification information.

The foregoing and other objects, features, modes and advantages of the exemplary embodiments will become more apparent from the following detailed description of the exemplary embodiments when considered in conjunction with the accompanying drawings.

BRIEF DESCRIPTION OF THE DRAWINGS

FIG. 10 shows information on the relationship between the user's identification information and the number of types of decorative objects owned by the user of an embodiment of the present disclosure; and FIG. 11 is a table showing the relationship between the number of types of decorative objects owned by the user and the points added thereto of an embodiment of the present disclosure.

DESCRIPTION OF THE EMBODIMENTS

The information processing system of embodiments of the present disclosure is described below with reference to the drawings. The embodiments described below are examples of the implementation of the present disclosure, and are not limited to the specific configuration described below. In implementing the present disclosure, specific configurations according to the form of implementation may be adopted as appropriate.

Figure 1:
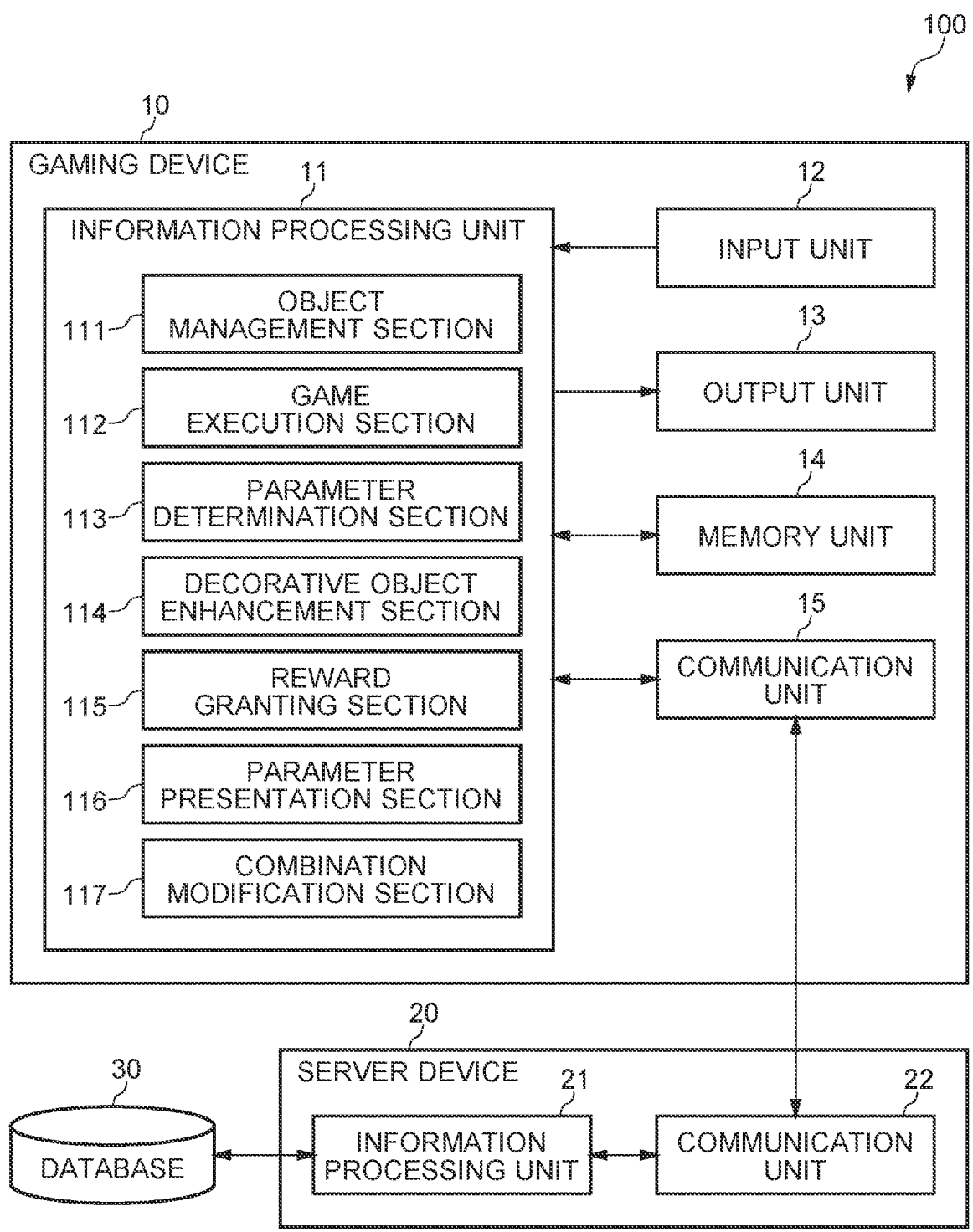
FIG. 1 is a block diagram of the game system of the present disclosure.

FIG. 1 is a block diagram of the game system of the embodiment of the present disclosure. The game system 100 as an information processing system has a gaming device 10, a server device 20, and a database 30. The gaming device 10 may be a dedicated gaming device or a general-purpose information processing device. If the game system 10 is a dedicated gaming device, it may be a device used exclusively to execute the game of this embodiment, or it may be a device capable of executing other games as well. When the gaming device 10 is a general-purpose information processing device, the gaming device 10 may be a personal computer, tablet computer, smartphone, etc. that operates by a predetermined OS.

The server device 20 executes various information processing, data supply, and other processes in response to requests from the gaming device 10 via communication. The server device 20 performs processing by referring to the database 30 as necessary.

The gaming device 10 and the server device 20 communicate with each other according to a predetermined communication protocol. The gaming device 10 and the server device 20 may communicate via a communication network such as the Internet or a wide-area network. Part or all of the communication between the gaming device 10 and the server device 20 may be wireless communication. In this embodiment, the gaming device 10 is a smartphone, the server device 20 is a device on the Internet, and the gaming device 10 can communicate with the server device 20 by connecting to the Internet via a base station of a cellular phone company, or by connecting wirelessly to the Internet via a wireless LAN router.

The gaming device 10 is equipped with an information processing unit 11, an input unit 12, an output unit 13, a memory unit 14, and a communication unit 15. The information processing unit 11 comprises a computer equipped with a processor, memory, and the like. When the processor executes the information processing program, the information processing section 11 functions as a object management section 111, a game execution section 112, a parameter determination section 113, a decorative object enhancement section 114, a reward granting section 115, a parameter presentation section 116, and a combination modification section 117. The information processing program is provided stored in a non transitory computer-readable storage medium, and the gaming device 10 as the information processing device reads and executes the information processing program from this non-transitory computer-readable storage medium.

The input unit 12 is a touch sensor and the output unit 13 is a display panel. The touch sensor as input unit 12 is superimposed on the display panel as output unit 13 to form a touch panel. By using this touch panel, the user can make inputs in relation to the screen displayed on the display panel. The user can, for example, tap a button object displayed on the touch panel to give instructions to the button object. The gaming device 10 is further provided with a speaker for outputting sound and a vibrator for outputting vibration as the output unit 13.

The memory unit 14 stores various information necessary for executing the game, saved data of the game, etc. The communication unit 15 is for communicating with the server device 20. The gaming device 10 in this embodiment is equipped with a wireless LAN connection module for connecting to a wireless LAN and a cell phone network connection module according to the communication standards of the cell phone network for connecting to the cell phone network as the communication unit 15.

Prior to the explanation of information processing in the gaming device 10, the game played on the gaming device 10 will be explained. In the following description, a person who uses the gaming device 10 is referred to as a user. Among the users, those who specifically participate/attempt to participate in the game may be referred to as players. In this embodiment, the player selects a character that he/she manipulates (hereinafter referred to as "player character") as a game object to be used in the game and participates in the game.

The player can select a player character to participate in the game from among normal characters, but it is also allowed for the player to select an in-game avatar (hereinafter simply referred to as "avatar") to which decorative objects are attached (hereinafter referred to as "avatar character"). When using an avatar character as a player character, the player may create his/her own avatar to participate in the game or use an avatar that has been prepared in advance. Players can also acquire decorative objects by satisfying predetermined acquisition conditions. Many types of decorative objects (e.g., about 100 types) are available as decorative objects that players can acquire.

The gaming device 10 has a configuration to increase the entertainment value of users collecting decorative objects as game objects and using them in games.

In the game of this embodiment, the user earns points after completing one game. These points include base points, action points, and goal points. Base points are awarded at the start of the game according to the characters who participated in the game and the items used by those characters in the game. For example, the base points are increased if the character or the item used by the character has a high rarity. Action points are points awarded for performing a specific action during the game, for example, an attack technique. Goal points are points awarded for achieving the main objective of the game. For example, in a racing game, goal points are awarded according to the ranking, and in a game where the goal itself is to reach the goal, a fixed number of points may be awarded for reaching the goal.

Players can receive in-game rewards at the end of the game according to the total points obtained by adding up the above base points, action points, and goal points. In this embodiment, the user can obtain a number of reward items according to the total points as in-game rewards. The user accumulates these reward items and can receive various benefits in the game according to the accumulated number of reward items. For example, the number of available stages may be increased or the number of available game objects may be increased according to the accumulated number of reward items.

In this embodiment, a racing game is exemplified as a game. In participating in the racing game, the player selects the game object to be used by him/herself. Specifically, the player selects a player character as a driver, a vehicle (cart) as an item to be used by the player character, and a glider to be equipped on the vehicle as game objects. The player 61 can also select a race course to play.

Two character types are available as player characters: one character type is a normal character and the other is an avatar character consisting of a combination of a decorative object and an avatar decorated with the decorative object. In this embodiment, the decorative object is a set of racing suit and helmet (the set of racing suit and helmet is hereinafter referred to as "character suit"). In this embodiment, when a player selects an avatar character as a player character, the player selects the character suit presented as a choice together with the normal objects. If the character suit is selected, the combination of the selected character suit and avatar becomes the player character. In other words, if the player selects a character suit, the avatar wearing the selected character suit becomes the player character (avatar character). As described below, the user can also select and change the avatar to be combined with the character suit.

Base points are awarded according to the player character, vehicle, and glider used to participate in the race. Action points are awarded when a player character performs a specific action during the race, such as "hitting the opponent with an item for attack," "hitting a projection or other object to make the vehicle jump up," or "performing a drift". Goal points are awarded according to the rank at the finish line. As the user's accumulated number of reward items increases, the number of race courses in which the user can participate may increase, or the number of objects available for the user to race may increase.

In this embodiment, when an avatar character is selected as the player character, points corresponding to the number of character suit types owned by the user are added to the base points. In other words, when an avatar character is selected as the player character, the more types of character suits the user owns, the more points are added to the base points. This gives an advantage to the user who owns more types of character suits, and the user is incentivized to collect more types of character suits and play the game using the character suits.

The configuration for executing the above game is described below. The object management section 111 of the information processing unit 11 of the gaming device 10 manages the acquisition and possession of character suits by the user. In other words, the object management section 111 associates the character suits for which the user has met the acquisition conditions with the user's identification information from a character suit group consisting of multiple types of character suits. Note that both normal characters and character suits can be acquired by satisfying the predetermined acquisition conditions in this embodiment. However, there may be a normal character or character suit that can be acquired unconditionally. Therefore, the object management section 111 also associates normal characters owned by (or available to) the user with the user's identification information.

The condition for acquiring a character suit includes the user purchasing a character suit at an in-game store. In other words, the user can purchase a character suit in the in-game store. The acquisition condition also includes that a lottery is conducted to acquire at least some of the character suits from a character suit group consisting of multiple types of character suits, and that the user decides which character suit to acquire. In other words, the user can perform the lottery and acquire the character suit won by the lottery.

In addition, the acquisition condition may also be that the character suit was distributed in a campaign, granted as an in-game reward, etc. If the user does not yet own any character suits, the first character suit can be acquired with that as the acquisition condition. In other words, the first suit is automatically granted to the user, without having to be purchased or won in the lottery.

The correspondence between the user's identification information and the character suit is stored in the memory 14 of the gaming device 10 and in the database 30. The state in which a character suit is associated with a certain user's identification information means that the user has acquired and owns the character suit. The set of character suits that may be acquired by a user may include tens to hundreds of different character suits.

The game execution section 112 executes a game (in this embodiment, a racing game) in which a player character selected by the user appears. When the user selects a character suit, the game execution section 112 executes the game with an avatar character, which is a combination of the character suit and an avatar, as the player character.

The avatar combined with the character suit can also be selected by the user from a group of multiple selectable avatars. In this embodiment, when selecting a player character in a game, an avatar is associated with the character suit in advance by the user, and when the user selects the character suit at the start of the game, the avatar associated with the character suit is selected.

The method of associating character suits with avatars is as follows. When the first character suit is acquired, the user is forced to specify the avatar to be associated with the character suit when the suit is acquired, and the character suit is associated with the avatar. For the second and subsequent character suits, the avatar that was last associated with one of the character suits will be associated with the newly acquired character suit. The combination of character suit and avatar can be changed at any time. In this embodiment, the avatar consists of a face and body, and the user can freely select facial parts and hairstyle. The avatar may furthermore be able to change its height and body shape. In FIGS. 2, 3, 5, and 6, the drawing of the avatar's face parts is omitted.

The avatar to be combined with the character suit can be selected from among the avatars prepared in advance and avatars created by the user. The pre-prepared avatars may include avatars created by users other than the user in question, i.e., avatars created by other people. Others may include users who have played games in the same race as the user in question in the past.

The parameter determination section 113 determines points as parameters according to the results of the execution of the game by the user. The parameter determination section 113 determines base points, action points, and goal points as points, as described above. In particular, the parameter determination section 113 grants base points to the user according to the character used in the race game. The total points, which are the sum of base points, action points, and goal points, are used by the user to obtain in-game rewards.

When the user plays the game using an avatar character, the parameter determination section 113 determines the base points so that the base points are at least as high as the number of character suits associated with the user's identification information, that is, the more types of character suits the user owns.

Specifically, the parameter determination section 113 determines the base point by adding a predetermined amount of points for each type of character suit owned by the user. For example, if 10 points are added for every second and subsequent character suit owned, and the user owns 7 types of character suits, (10×6=) 60 points are added to the base points.

The base points determined by the parameter determination section 113 are not determined solely by the number of character suit types owned by the user, but are added, for example, according to the character type, according to the experience accumulated based on the number of times the character is used, and/or according to the number of times an in-game item that strengthens a character is used.

As described above, the parameter determination section 113 increases the points granted to the user by a certain increment for each increase in the number of character suit types owned by the user. That is, the parameter determination section 113 increases the base points by a certain increment (10 points) for every second and subsequent increase in the number of character suit types. Alternatively, the parameter determination section 113 may add points to the base points that increase progressively with the number of character suit types owned by the user. Alternatively, the parameter determination section 113 may conversely decrease the amount of points added per type as the number of types of character suits increases. The parameter determination section 113 may also set an upper limit to the base points added in accordance with the number of types of character suits owned by the user, so that no more base points are added than the upper limit.

If the acquisition conditions are met for duplicate character suits of the same type as character suits already owned by the user, the number of types of character suits owned by the user will not be increased, and the parameter determination section 113 will not determine the base points are not determined to be higher in proportion to the number of duplicates. Instead, the decorative object enhancement section 114 enhances the performance of the character suit in accordance with the number of duplicates when the acquisition conditions are met for duplicates of the same type of character suit already owned by the user. There is an upper limit to the number of duplicates for which a character suit can be enhanced, and the decorative object enhancement section 114 enhances the performance of the character suit according to the number of duplicates within this upper limit. The player character can activate various skills during the game, which may be different for each character suit, and the decorative object enhancement section 114 may enhance different skills for each of these character suits. The skills may be enhanced, for example, by increasing the number of attack objects fired at the opponent character, increasing their size, increasing the number of times they are used, or by temporarily or permanently increasing at least one of the maximum speed or acceleration of the vehicle.

The reward granting section 115 grants an in-game reward to the user if, after the game is over, the total points obtained by adding up the respective points determined by the parameter determination section 113 reaches a predetermined threshold value. For example, if the total points earned by the user in the game are above the first threshold and below the second threshold, the reward granting section 115 grants one reward item as an in-game reward to the user; if the total points earned are above the second threshold and below the third threshold, two reward items are granted to the user; if the total points earned are above the third threshold and below the fourth threshold, three reward items are granted to the user; if the total points earned are above the fourth threshold and below the fifth threshold, four reward items are granted to the user; if the total points earned are above the fifth threshold five reward items are granted to the user.

The number of reward items given to a user is capped for each user and each course. For example, if a user has obtained three reward items by playing a certain course, even if the user plays the same course again, if the total points obtained are less than the fourth threshold, the first to third reward items will not be granted again. The fourth reward item is granted when the total points earned are above the fourth threshold, and the fifth reward item is granted when the total points earned are above the fifth threshold.

The parameter presentation section 116 presents to the user, for each character suit, the base points that are awarded by the use of the character suit by the user. These base points include points awarded according to the number of types of character suits owned by the user. In addition to or instead of this, the parameter presentation section 116 may indicate to the user an increase in points based on the number of types of character suits owned by the user. For example, the parameter presentation section 116 may, on a screen displaying a character suit owned by the user, indicate the base points for using the character suit in a race, and when the player runs a race using an avatar character whose character suit is applied to the avatar, the parameter presentation section 116 displays the points that are to be added with each increase in the number of types of character suits owned by the player.

The combination modification section 117 changes the avatar to be combined with the character suit based on the user's instruction input. In other words, the avatar associated with the character suit can be changed by the user. The combination modification section 117 can change the avatar to be combined with the character suit in the process of editing the character suit. The combination modification section 117 may allow the user to further select an avatar to wear the character suit when the user selects the character suit at the start of the game, or may allow the user to first select an avatar and then select the character suit to be worn by that avatar. The user may also select an avatar and then select a character suit to be worn by the avatar.

The avatar can be created and edited after opening a web page with browser software and logging into the user's own account. The avatar created and edited on this web page is stored in the database 30, and when the gaming device 100 connects to the server device 20 using the communication unit 15, the avatar created and edited is updated on the gaming device 100. The appearance of the avatar can be changed on this web page. The user may be able to change only the appearance of the avatar he/she created, or the user may be able to change the appearance of the avatar he/she created and the avatar prepared in advance. The gaming device 100 may also have the function of an avatar modification section that creates and edits avatars.

Figure 2:
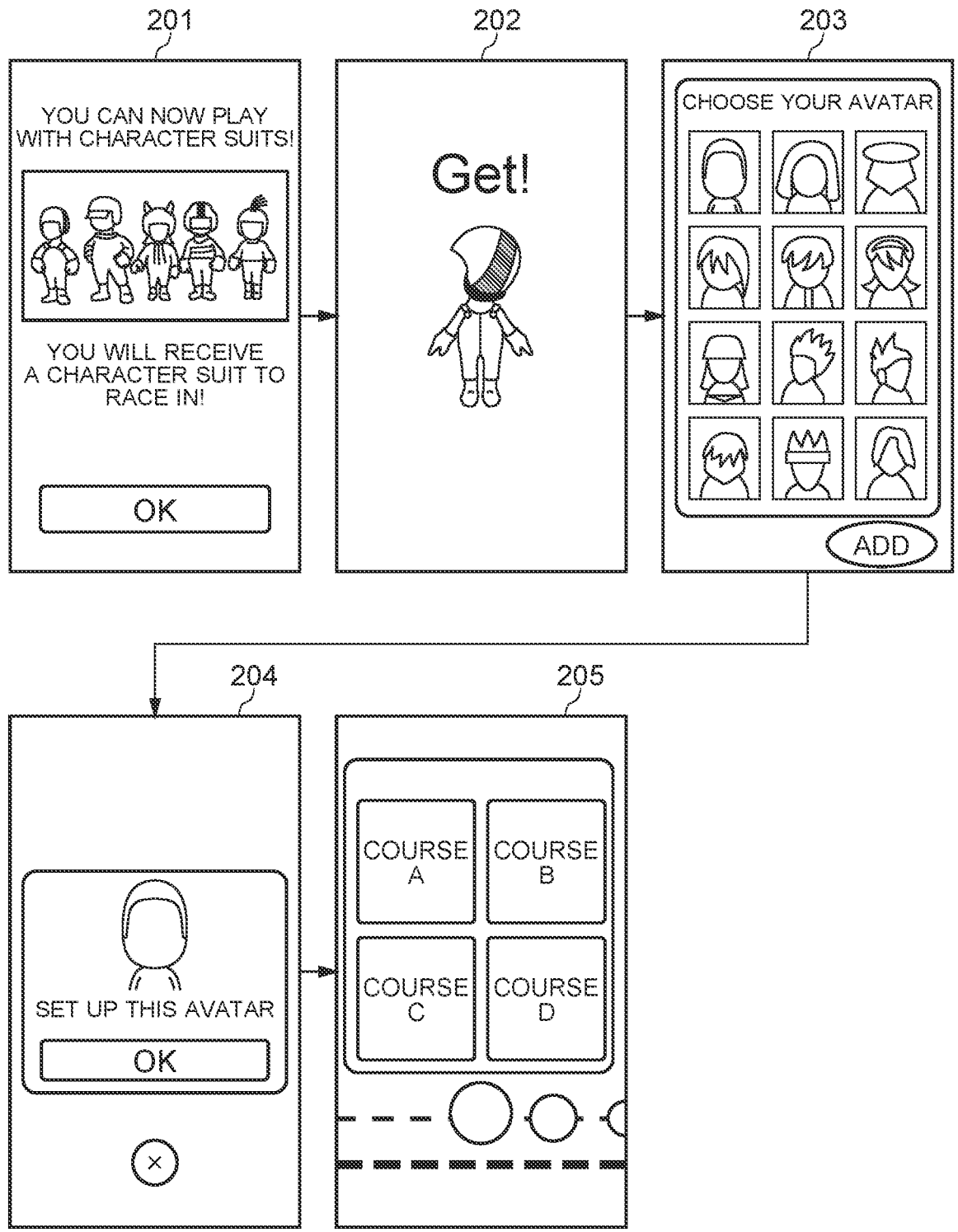
FIG. 2 shows an example of screen transitions of an embodiment of the present disclosure.

FIG. 2 shows an example of screen transitions of an embodiment of the present disclosure. FIG. 2 shows the screen transition when the user first acquires a character suit. When the user progresses through the game and satisfies the predetermined conditions, participation in the game by the character suit is permitted. The screen 201 explains that the user is now allowed to participate in the game using the character suit.

When the user is allowed to participate in a game using a character suit, the user is automatically given a character suit, as shown in the screen 202. Once a character suit is given to the user, a screen that allows the user to select an avatar to wear the character suit is displayed, as shown in the screen 203. The screen 203 displays a list of avatars to be fitted with the character suit. This list shows at least some of the avatars prepared in advance by the operation, avatars created by the user, and avatars created by others. The user can also add new avatars to the list of avatars on the screen 203.

The user can select one of the avatars from these lists of avatars and set the avatar to wear the acquired character suit, as shown on the screen 204. When the OK button is indicated on the screen 204, the next screen 205 for selecting the course to race is displayed. When a second or later character suit is acquired, the avatar that was set when the first suit was acquired is assigned to the character suit by default. The avatar can later be changed for each character suit individually.

Figure 3:
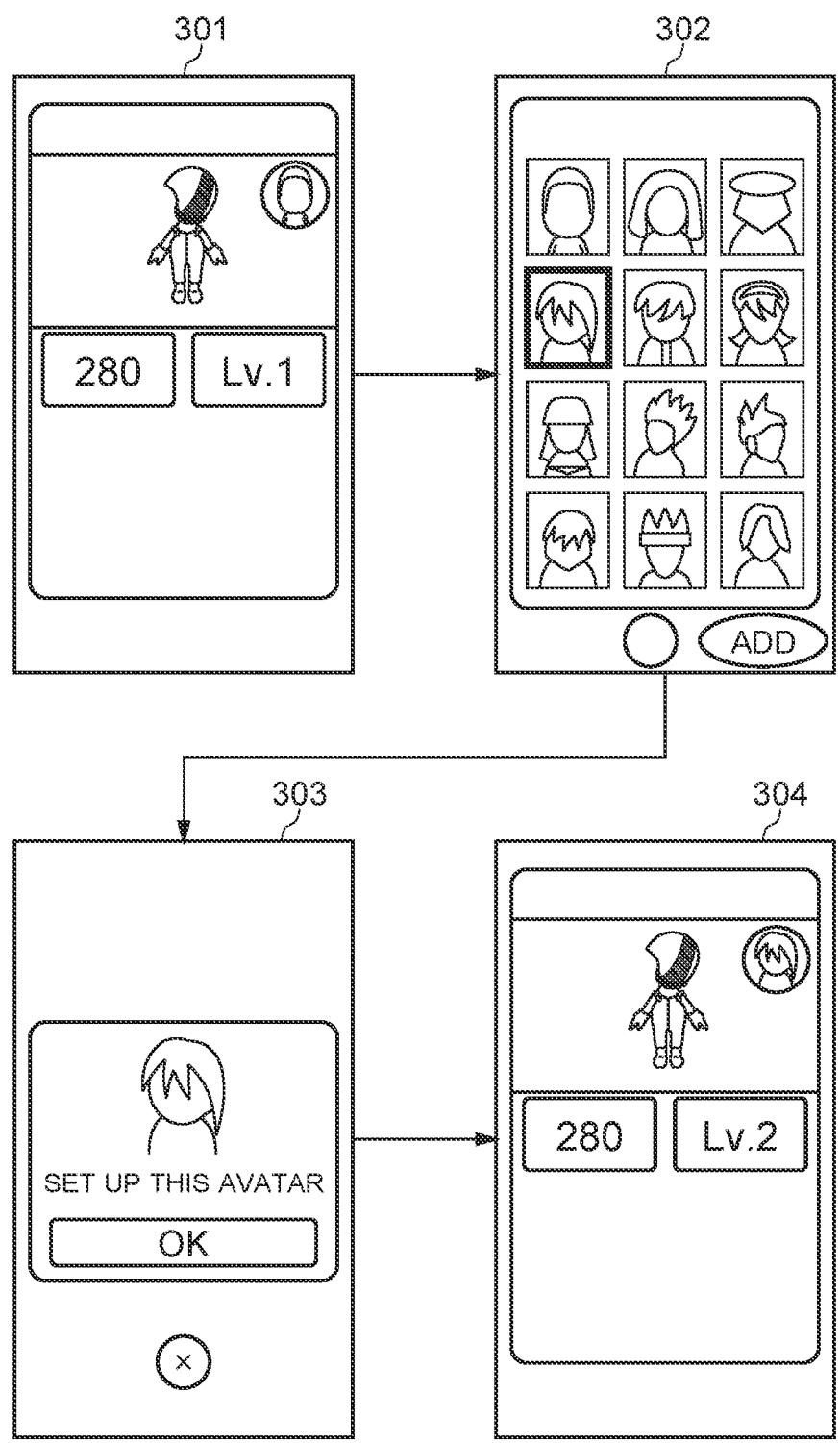
FIG. 3 shows an example of a screen transition of an embodiment of the present disclosure.

FIG. 3 shows an example of screen transitions of an embodiment of the present disclosure. FIG. 3 shows the screen transition when the user changes the avatar to which the character suit is attached. The screen 301 shows a certain character suit owned by the user, the base points "280" obtained by using this character suit in a race, and the skill level value "Lv.1" of this character suit. In addition, the screen 301 shows an avatar associated with the character suit, to which the character suit is attached. When the user taps on the avatar, the avatar to which the character suit is attached can be changed. This skill level value is a value that is enhanced (leveled up) by the decorative object enhancement section 114 described above.

The screen 302 is a screen for changing the avatar. The screen 302 displays a list of avatars that can be selected. When the user selects one of these avatars, the selected avatar is set as the avatar to wear the character suit, as shown in the screen 303. When the OK button is tapped on the screen 303, the avatar to which the character suit is attached is changed in association with the character suit on the character suit screen, as shown in the screen 304.

Figure 4:
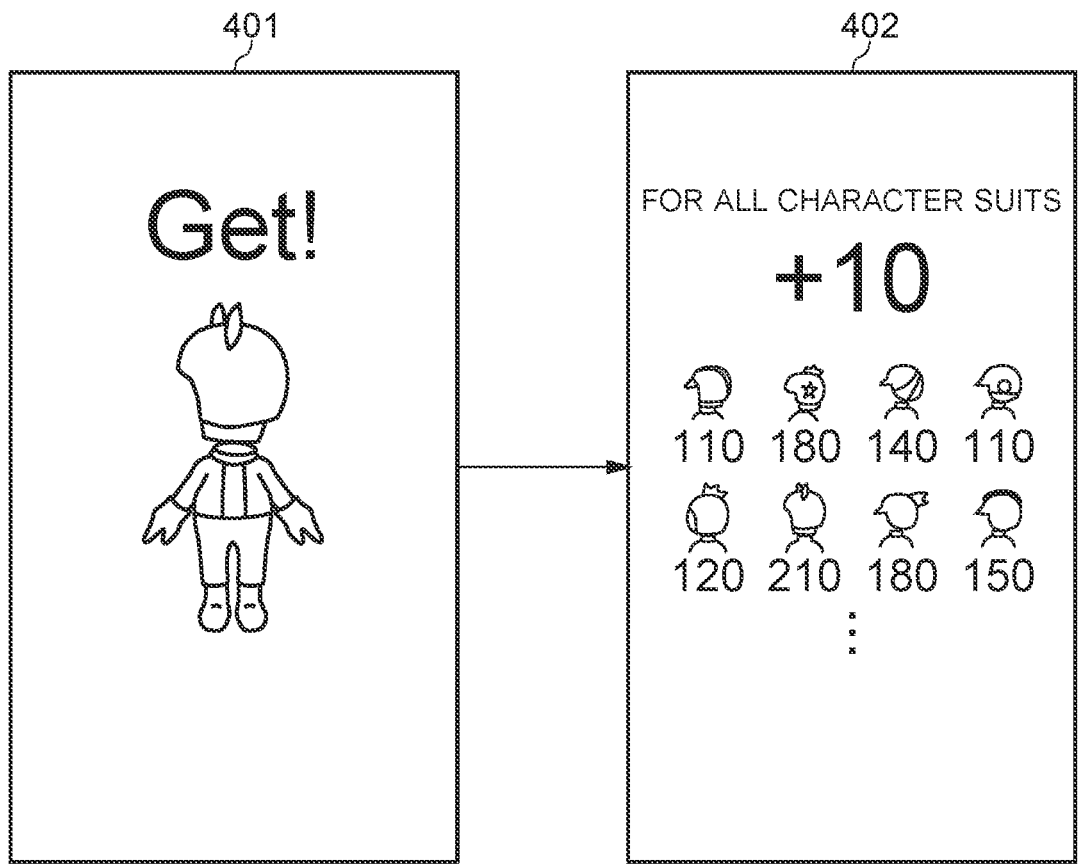
FIG. 4 shows an example of a screen transition of an embodiment of the present disclosure.

FIG. 4 shows an example of screen transitions of an embodiment of the present disclosure. FIG. 4 shows the screen transition when the user acquires a new character suit. When the user acquires a new character suit on a screen 401, a list of character suits acquired by the user up to that point is displayed on a screen 402. If the user owns nine or more character suits, up to eight are displayed on the screen 402. However, in that case, as shown in FIG. 4, symbols such as " . . . " are used to indicate that the user owns character suits other than those displayed. The number of types of character suits that the user owns will be increased, and the base points of all character suits will thereby be increased by "10".

As described above, the screen 402 may display an increase in base points determined by the number types of the character suits owned by the user. Specifically, the amount of increase in base points is 0 points when the user owns one type of character suit, and after the second type, 10 points are added for each additional type, so that, for example, the amount of increase in base points based on the number of types of character suits owned by the user is, For example, if the user owns 8 types of character suits, the increase in base points is 70 points; if the user owns 15 types of character suits, the increase in base points is 140 points; and if the user owns 20 types of character suits, the increase in base points is 190 points. The amount of increase in base points is 190 points if you own 20 types of character suits.

Figure 5:
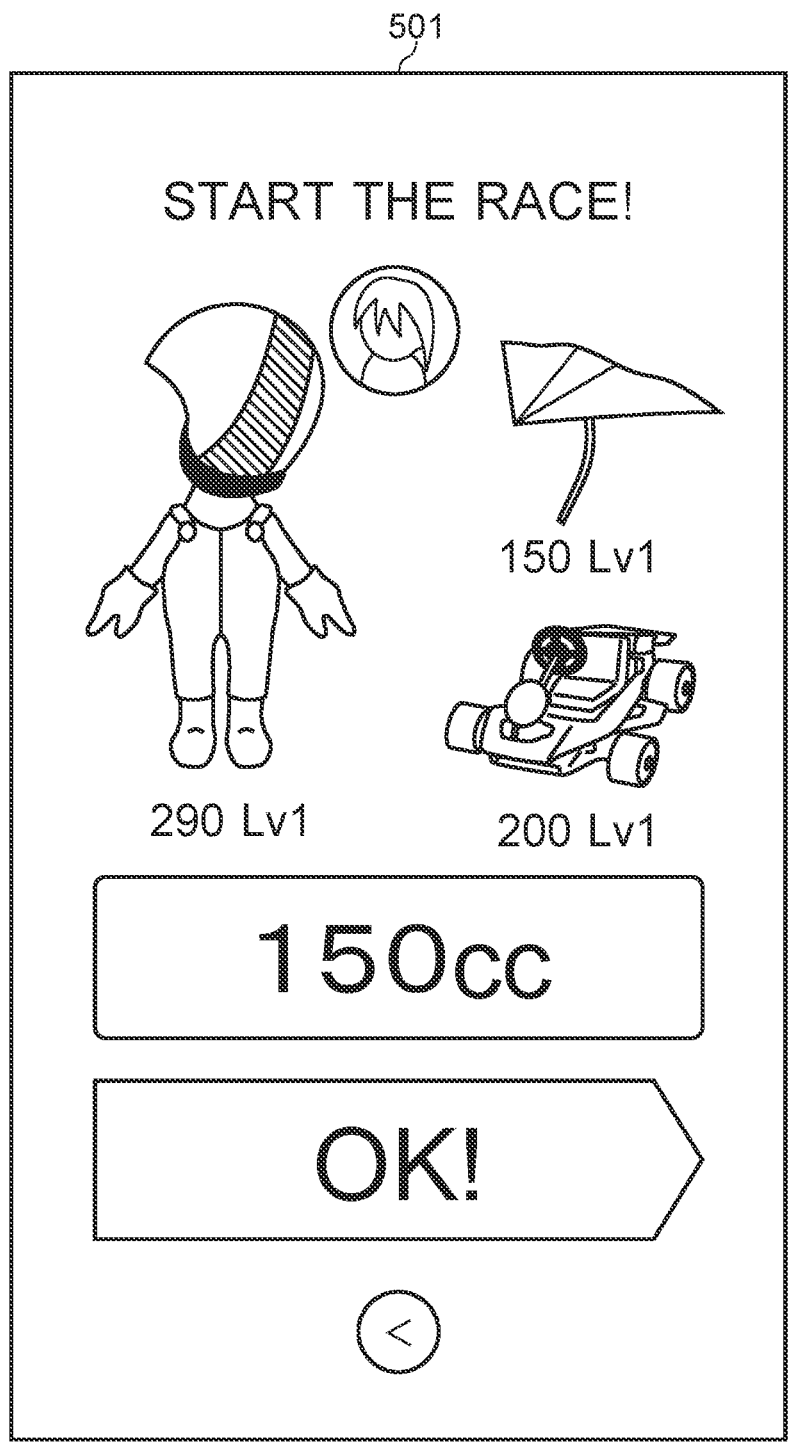
FIG. 5 shows an example of a screen of an embodiment of the present disclosure.

FIG. 5 shows an example of screen transitions of an embodiment of the present disclosure. In FIG. 5, a screen 501 is shown just before the start of the racing game. The screen 501 shows the game objects that the player has selected for this racing game. Specifically, the screen 501 shows the character suit selected by the player and the avatar combined with that character suit, the vehicle and glider selected by the player, and for each game object, the base points obtained by selecting it and the skill level value of each game The skill level value of each game object is shown. The player taps the OK button to start the racing game. In the screen shown in FIG. 5, it is also possible to change the avatar to be combined with the character suit or add an avatar by tapping the avatar that can be combined with the character suit.

The base points of the character suit were 280 at the time of FIG. 3, but the base points of all character suits have increased by 10 due to the acquisition of a new character suit in FIG. 4, so the base points of the character suits have increased by 10 from 280 to 290 in FIG. 5.

Figure 6:
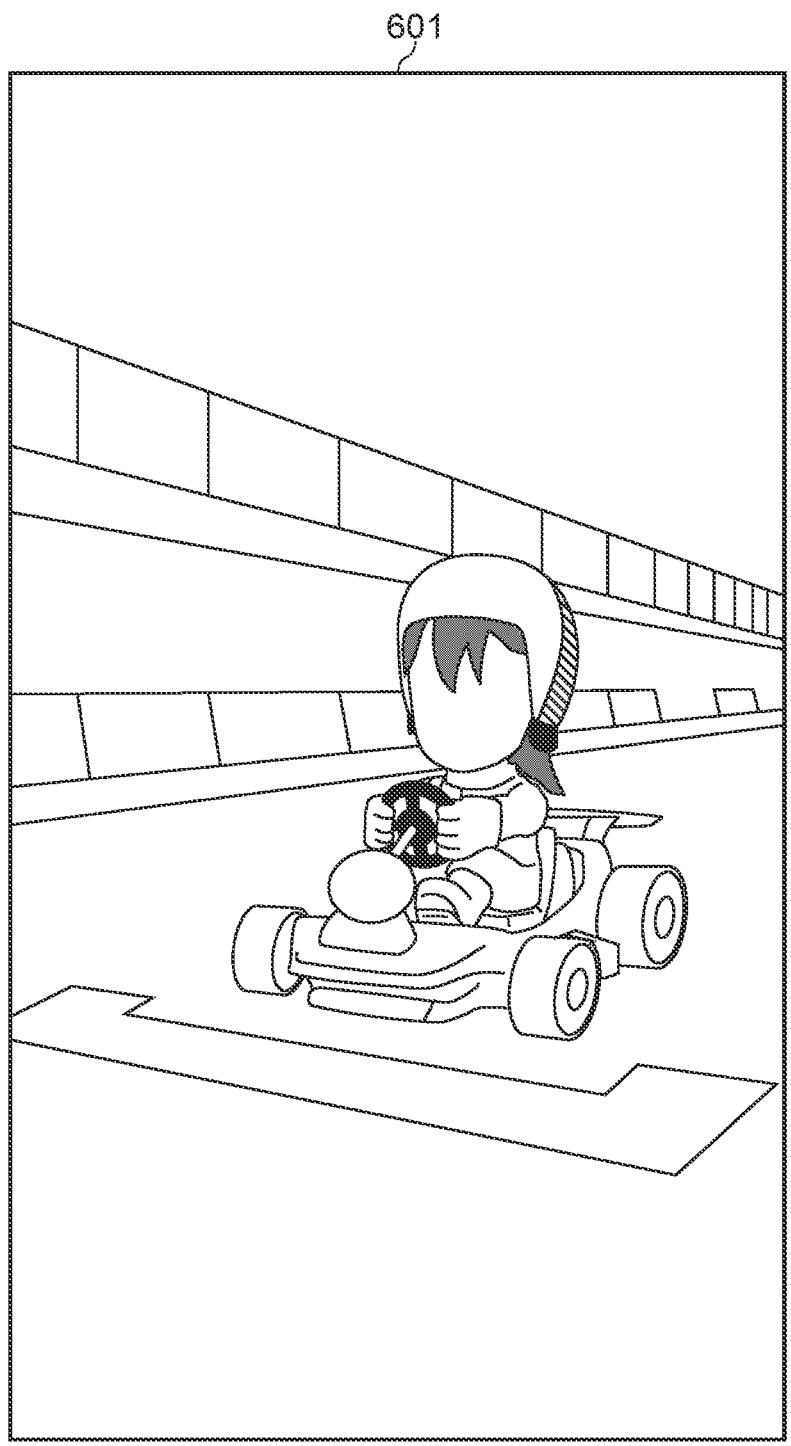
FIG. 6 shows an example of a screen of an embodiment of the present disclosure.

FIG. 6 shows an example of screen transitions of an embodiment of the present disclosure. In FIG. 6, a screen 601 is shown in which an avatar wearing a character suit selected by the player as a player character participates in a racing game in a vehicle selected by the player.

Figure 7:
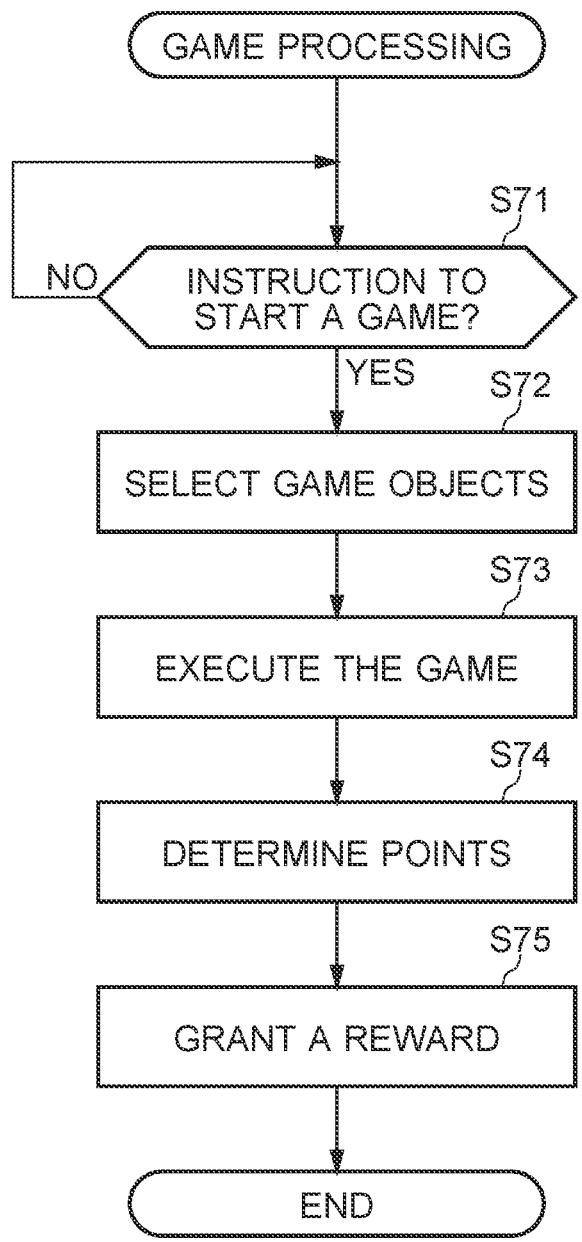
FIG. 7 is a flowchart of the game processing of an embodiment of the present disclosure.

FIG. 7 is a flowchart of the game processing of an embodiment of the present disclosure. The game execution section 112 waits for the game to be started by the user (NO in step S71). When the game execution section 112 is instructed to start the game (YES in step S71), it allows the player to select a game object (step S72). As described above, the game execution section 112 causes the user to select a player character, a vehicle, and a glider as the game object, which serves as the driver. The player can select either a normal character or a character suit as the driver.

When the game execution section 112 is instructed to start a racing game after the game object is selected and the course as the game stage is selected, the racing game is executed (step S73). When the game is completed, the parameter determination section 113 calculates the points to be awarded to the players for the completed game (step S74). As described above, the points to be awarded to the player are calculated as the sum of base points, action points, and goal points.

The reward granting section 115 grants a reward item to the player according to the points determined by the parameter determination section 113 (Step S75). The reward granting section 115 grants more reward items the higher the points are.

Figure 8:
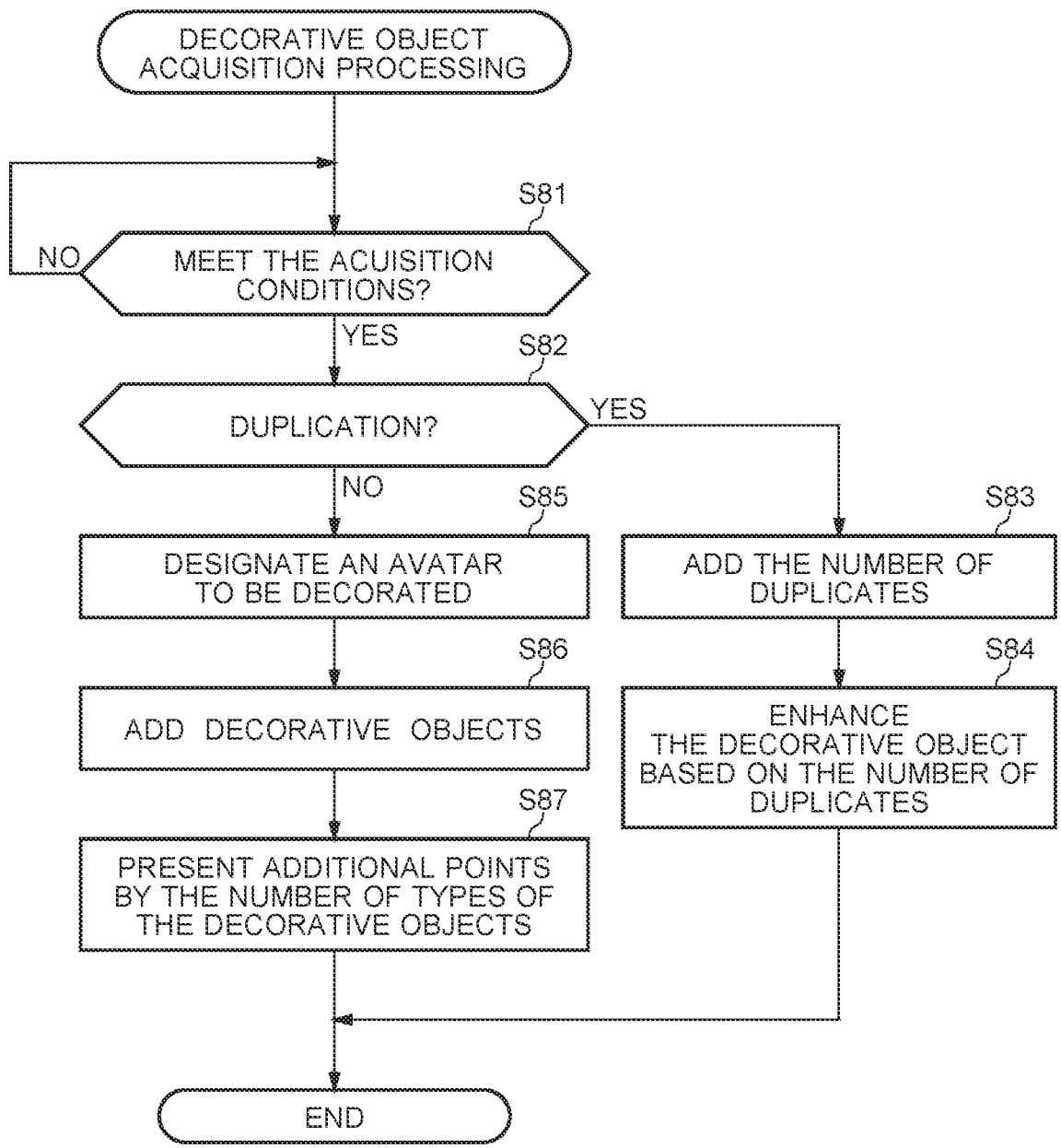
FIG. 8 is a flowchart of the decorative object acquisition process of an embodiment of the present disclosure.

FIG. 8 is a flowchart of the decorative object acquisition process in the present disclosure. The object management section 111 waits for the user to meet the acquisition conditions for the character suit (NO in step S81). When the user satisfies the acquisition condition (YES in step S81), the object management section 111 determines whether the user already owns the character suit that satisfies the acquisition condition, i.e., whether there is a duplication (step S82).

If there are duplicates (YES in step S82), the object management section 111 adds the number of duplicates (step S83). For example, if the number of duplicates of a character suit is already 2 and the character suit is acquired this time, the object management section 111 adds 1 to the number of duplicates to make it 3. The decorative object enhancement section 114 enhances the character suit based on the number of duplicates. Specifically, the decorative object enhancement section 114 increases the level value of the character suit.

If the object management section 111 has no duplicates in the acquired character suit (NO in step S82), an avatar is set to be decorated by the character suit (step S85). As mentioned above, when the first character suit is acquired, the avatar designated by the user to be combined is set, and when a second or subsequent character suit is acquired, the avatar that was most recently combined with the character suit is automatically combined with the newly acquired character suit. When an avatar is set to wear the character suit, the object management section 111 adds the character suit as one of the character suits owned by the user (step S86).

The parameter presentation section 116 presents the base points added by the newly added character suit (step S87). For example, the parameter presentation section 116 presents to the user the amount of increase in base points (+10 in the example in FIG. 4) due to the acquisition of one new character suit by means of the image 402 shown in FIG. 4.

Figure 9:
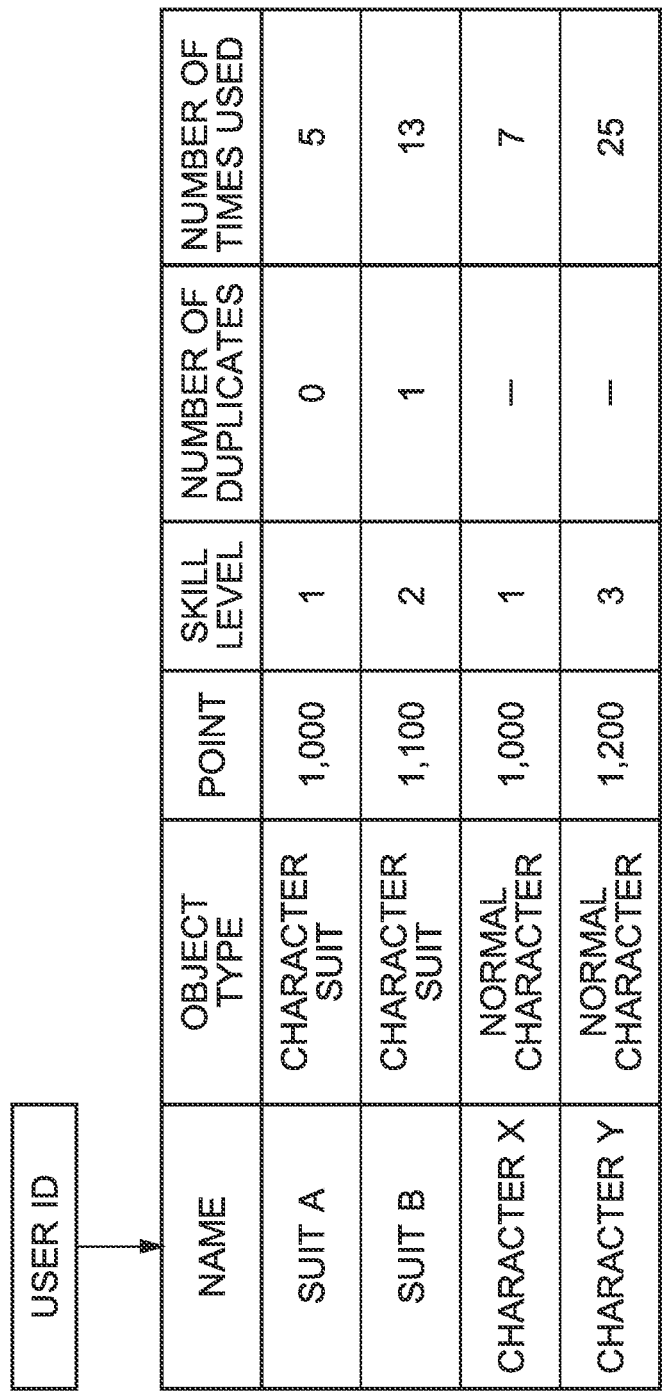
FIG. 9 shows information associated with the user's identification information of an embodiment of the present disclosure.

FIG. 9 shows the information associated with the user's identification information of an embodiment of the present disclosure. As described above, the object management section 111 associates the user's identification information with game objects owned by the user. This association is stored in the memory unit 14 of the gaming device 10 and in the database 30. When the association between the user's identification information and the game object is updated, the update is indicated via the communication unit 15 of the gaming device 10 and the communication unit 22 of the server device 20, and the information processing unit 22 updates the database.

In the memory unit 14 and the database 30, information on game objects owned by a user is associated and stored for the user ID as identification information. The game object information associated with the user ID includes the game object name to identify the type of game object, the object type (normal character or decorative object), the base points set for that game object, the skill level, the number of duplicates, and the number of times the game object has been used is included. The game object ID indicating the type of game object may be stored instead of or in addition to the name as information for identifying the type of game object.

FIG. 10 shows information on the relationship between the user's identification information and the number of types of decorative objects owned by the user of an embodiment of the present disclosure. The information shown in FIG. 10 is stored in database 30.

FIG. 11 is a table showing the relationship between the number of types of decorative objects owned by the user and the points added thereto of an embodiment of the present disclosure. As mentioned above, the additional points increase by 10 points per type when the number of types is 2 or more.

At the time of starting the game, the parameter determination section 113 obtains from the database 30 the information on the number of types of decorative objects owned by the user shown in FIG. 10 and the table showing the relationship between the number of types of decorative objects and the number of additional points shown in FIG. 11, and by referring to the table, determines the number of points corresponding to the number of types of decorative objects owned by the user to determine the base point.

As explained above, the information processing system 100 in this embodiment has an object management section 111, which associates at least some game objects from a group of game objects composed of multiple types of game objects, for which the user has satisfied the acquisition conditions, with the user's identification information; the game execution section 112, which executes a game using a game object selected by the user from among the game objects associated with the user's identification information; and the parameter determination section 113, which grants points to the user for obtaining in-game rewards in response to the execution of the game by the game execution section 112, wherein the parameter determination section 113 grants higher points to the user as the number of types of game objects associated with the user's identification information increases.

In the above embodiments, a racing game is taken as an example of a game executed by the game execution section 112. However, the games to which the present disclosure applies are not limited to racing games, but may be other types of games such as, for example, combat games, dungeon exploration games, puzzle games, etc. In the above embodiment, the parameter determination section 113 determines the base point, which is treated as equivalent to parameters given according to the achievement level of the main objective of the game (in the above example, to reach the goal as quickly as possible) (i.e., the goal point), as a parameter to be determined according to the number of types of decorative objects owned by the user. In other words, the parameter determination section 113 combined the goal point and the base point (and the action point) and used the combined point as the parameter for determining whether or not to award reward items. However, the parameter to be determined according to the number of types of decorative objects owned by the user is not limited to such a point. The parameter determined by the parameter determination section 113 may be a parameter that is not treated equally with the point awarded based on the achievement of the main objective of the game. For example, goal point may not be used to determine whether or not to award reward items, or the goal point may not be determined even when the main objective of the game is achieved, and furthermore, the game itself may not have the concept of a goal. For example, the goal point may be used to obtain a new course, and the point determined by the number of decorative object types may be used to obtain in-game items, separate from obtaining a new course.

In the above embodiment, the avatar to be decorated with decorative objects was also selectable by the user from a plurality of avatar groups, but the avatar may be fixed. Even if the avatar is fixed, it may be possible to change the appearance of the avatar.

In the above embodiment, the association between the user's identification information and the decorative object owned by the user was stored in the storage unit 14 of the gaming device 10 and in the database 30, but it may be stored in only one of them. When the association is stored in the database 30, each time the user executes the information processing program of this embodiment, the information of the association stored in the database 30 may be downloaded to the gaming device 10 and temporarily stored in the gaming device 10.

In the above embodiments, an example in which the information processing system is a game system is described, but the information processing system of the present disclosure is not limited to one in which a game is executed as the main purpose of information processing. The information processing system may, for example, be a system that provides a service that allows many people to communicate and engage in various pseudo social activities in a virtual space. In this case, avatars and decorative objects that decorate avatars are used, and avatars decorated with decorative objects can participate in services such as events in the virtual space, etc., and in the same way as in the above embodiment, a mechanism can be adopted to enable users to collect multiple types of decorative objects that decorate their avatars.

In this case, the information processing system has an object management section, which associates at least some decorative objects from a group of decorative objects composed of multiple types of decorative objects with the user's identification information, for which the user has met the acquisition conditions; a service executing unit, which executes a service in which an avatar decorated with the decorative objects participates, using an object selected by the user from among the decorative objects associated with the user's identification information as the user's avatar; and a parameter assignment unit, which assigns parameters for the user to obtain rewards in response to the execution of the service by the service execution section, wherein the parameter granting section grants higher parameters the more the number of types of decorative objects associated with the user's identification information.

The invention claimed is:

1. A non-transitory computer-readable storage medium having stored therein an information processing program that, when executed, causes a computer including a processor to perform operations comprising:
    associating at least some game objects from a group of game objects comprising a plurality of types of game objects, for which a user has met acquisition conditions, with the user's identification information;
    executing a game using a game object selected by the user from among the game objects associated with the user's identification information; and
    determining a parameter for granting an in-game reward to the user, at least according to which game objects are used in the game,
    wherein the game is executed using a combination of a decorative object and an in-game avatar when the object type of the game object selected by the user is a decorative object type, and
    wherein the determining is performed such that when the user executes the game using the combination of the decorative object and the in-game avatar, at least a value of the parameter becomes larger the greater the number of decorative object types that are associated with the user's identification information.

2. The non-transitory computer-readable storage medium according to claim 1, wherein when the user participates in the game by using another game object whose object type is different from the decorative object type, the parameter is determined based on the number of times the another game object is enhanced and/or an experience value accumulated in accordance with the number of times the another game object is used, rather than being determined based on the number of types of game objects associated with the user's identification information that are non-decorative object types.

3. The non-transitory computer-readable storage medium according to claim 1, wherein the in-game avatar is one of a plurality of different types.

4. The non-transitory computer-readable storage medium according to claim 1, wherein the in-game reward is granted to the user if the parameter reaches a threshold value after the game ends.

5. The non-transitory computer-readable storage medium according to claim 1, wherein the game comprises game stages, and
    wherein the in-game reward depends on a threshold value set for a game stage being played and is granted when the parameter reaches the threshold value set for the in-game stage being played, but is not again granted when the parameter again reaches the threshold value set for the in-game stage being played.

6. The non-transitory computer-readable storage medium according to claim 1, wherein the parameter is not determined to be higher in proportion to a number of the duplicates when the acquisition condition is met for a decorative object of the same type as the decorative object already associated with the user's identification information.

7. The non-transitory computer-readable storage medium according to claim 1, wherein when the acquisition condition is met for a decorative object of the same type as the decorative object already associated with the user's identification information in duplicate, a performance of the decorative object is enhanced in proportion to the number of duplicates.

8. The non-transitory computer-readable storage medium according to claim 7, the performance of the decorative object is enhanced in proportion to the number of duplicates within an upper limit of the number of duplicates.

9. The non-transitory computer-readable storage medium according to claim 1, wherein an increased value of a parameter is presented to the user based on the number of types of the decorative objects associated with the user's identification information.

10. The non-transitory computer-readable storage medium according to claim 1, wherein an appearance of the in-game avatar is changed in response to the user's instruction input.

11. The non-transitory computer-readable storage medium according to claim 1, wherein when the object type of the game object selected by the user is a decorative object type, the in-game avatar selected by the user is combined with the game object selected by the user and the game is executed.

12. The non-transitory computer-readable storage medium according to claim 11, wherein the game object selected by the user and the in-game avatars is combined based on the user's instruction input.

13. The non-transitory computer-readable storage medium according to claim 1, wherein the value of the parameter is increased by a constant increasing range with each increase in the number of types of decorative objects associated with the user's identification information.

14. The non-transitory computer-readable storage medium according to claim 1, wherein the acquisition condition includes purchasing of decorative objects from an in-game store by the user.

15. The non-transitory computer-readable storage medium according to claim 1, wherein the acquisition condition includes a lottery for acquiring at least some decorative objects from a group of decorative objects comprising a plurality of the decorative objects, and it is determined from the lottery which of the decorative objects is to be acquired by the user.

16. The non-transitory computer-readable storage medium according to claim 1, wherein the acquisition condition includes that the user has not acquired any decorative objects.

17. The non-transitory computer-readable storage medium according to claim 1, wherein a parameter increase value is based on the number of types of decorative objects associated with the user's identification information within an upper limit.

18. An information processing apparatus comprising:
a memory and at least one processor configured to cooperate to perform operations comprising:
associating at least some game objects from a group of game objects comprising a plurality of types of game objects, for which a user has met acquisition conditions, with the user's identification information;
executing a game using a game object selected by the user from among the game objects associated with the user's identification information; and
determining a parameter for granting an in-game reward to the user, at least according to which game objects are used in the game,
wherein the game is executed using a combination of a decorative object and an in-game avatar when the object type of the game object selected by the user is a decorative object type, and
wherein the determining is performed such that when the user executes the game using the combination of the decorative object and the in-game avatar, at least a value of the parameter becomes larger the greater the number of decorative object types that are associated with the user's identification information.

19. An information processing system comprising:
an object management section configured to associate at least some game objects from a group of game objects comprising a plurality of types of game objects, for which a user has met acquisition conditions, with the user's identification information;
a game execution section configured to execute a game using a game object selected by the user from among the game objects associated with the user's identification information; and
a parameter determination section configured to determine a parameter for granting an in-game reward to the user, at least according to which game objects are used in the game,
wherein the game execution section is further configured to execute the game using a combination of a decorative object and an in-game avatar when the object type of the game object selected by the user is a decorative object type, and
wherein the parameter determination section is further configured to determine the parameter so that, when the user executes the game using the combination of the decorative object and the in-game avatar, at least a value of the parameter becomes larger the greater the number of decorative object types that are associated with the user's identification information.

20. An information processing method executed in an information processing apparatus, the method comprising:
associating at least some game objects from a group of game objects comprising a plurality of types of game objects, for which a user has met acquisition conditions, with the user's identification information;
executing a game using a game object selected by the user from among the game objects associated with the user's identification information; and
determining a parameter for granting an in-game reward to the user, at least according to which game objects are used in the game,
wherein the game is executed using a combination of a decorative object and an in-game avatar when the object type of the game object selected by the user is a decorative object type, and
wherein the determining is performed such that when the user executes the game using the combination of the decorative object and the in-game avatar, at least a value of the parameter becomes larger the greater the number of decorative object types that are associated with the user's identification information.

* * * * *